(12) United States Patent
Feldhaus et al.

(10) Patent No.: US 8,960,396 B2
(45) Date of Patent: Feb. 24, 2015

(54) TORSIONAL VIBRATION DAMPING ARRANGEMENT, PARTICULARLY FOR THE POWER TRAIN OF A VEHICLE

(75) Inventors: Reinhard Feldhaus, Euerbach (DE); Christian Wickel, Wartmannsroth (DE); Norbert Ament, Oerlenbach (DE); Alexander Markow, Schweinfurt (DE); Michael Peterseim, Bergrheinfeld (DE); Erwin Wack, Niederwerrn (DE); Thomas Krüger, Berlin (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 775 days.

(21) Appl. No.: 13/125,705

(22) PCT Filed: Oct. 9, 2009

(86) PCT No.: PCT/EP2009/063186
§ 371 (c)(1),
(2), (4) Date: Apr. 22, 2011

(87) PCT Pub. No.: WO2010/049255
PCT Pub. Date: May 6, 2010

(65) Prior Publication Data
US 2011/0226576 A1     Sep. 22, 2011

(30) Foreign Application Priority Data

Oct. 28, 2008   (DE) .......................... 10 2008 043 211

(51) Int. Cl.
*F16H 45/02*      (2006.01)
*F16F 15/123*    (2006.01)
*F16F 15/12*     (2006.01)

(52) U.S. Cl.
CPC .................................. *F16F 15/1207* (2013.01)
USPC .......................... 192/3.3; 192/213.1; 464/68.1

(58) Field of Classification Search
CPC ...... F16F 15/123; F16F 15/1207; F16H 45/02
USPC .............. 192/30 V, 55.61, 213, 213.2, 109 R, 192/213.1; 464/68.1, 68.8
See application file for complete search history.

(56) References Cited

U.S. PATENT DOCUMENTS 2,183,130 A    12/1939   Binder
2,597,380 A     5/1952   Root
(Continued)

FOREIGN PATENT DOCUMENTS

DE        2736492      2/1978
DE        2817690     10/1979
(Continued)

*Primary Examiner* — Gene Crawford
*Assistant Examiner* — Terry Chau
(74) *Attorney, Agent, or Firm* — Cozen O'Connor

(57) ABSTRACT

A torsional vibration damper arrangement including a torsional vibration damper with a primary side and a secondary side rotatable with respect to the primary side around an axis of rotation against the action of a damper spring arrangement. One side of the primary side and secondary side includes two cover disk elements and a central disk element arranged between the cover disk elements. The cover disk elements are connected to one another by first connection elements radially inside the damper spring arrangement so as to be fixed axially and so as to transmit torque. The cover disk elements are connected to one another by second connection elements in such a way that they are prevented from moving axially away from one another. No torque can be transmitted between the cover disk elements by the second connection elements.

18 Claims, 4 Drawing Sheets

(56) References Cited

U.S. PATENT DOCUMENTS

| | | | | |
|---|---|---|---|---|
| 4,202,243 | A | * | 5/1980 | Leonhardt ................. 411/501 |
| 4,537,295 | A | | 8/1985 | Fädler et al. |
| 4,856,636 | A | * | 8/1989 | Meinhard ................. 192/70.17 |
| 5,308,282 | A | | 5/1994 | Hansen et al. |
| 5,688,177 | A | | 11/1997 | Lindner |
| 6,050,382 | A | | 4/2000 | Ester et al. |
| 6,299,540 | B1 | | 10/2001 | Ament |
| 2007/0205067 | A1 | * | 9/2007 | Frey et al. ................. 192/3.3 |
| 2007/0235277 | A1 | * | 10/2007 | Heuler et al. ............... 192/3.3 |

FOREIGN PATENT DOCUMENTS

| | | |
|---|---|---|
| DE | 3145312 | 5/1983 |
| DE | 4430762 | 3/1996 |
| DE | 4443453 | 6/1996 |
| DE | 19734017 | 2/1998 |
| DE | 19747220 | 5/1999 |
| DE | 19830497 | 1/2000 |
| GB | 506484 | 5/1939 |
| GB | 2292784 | 3/1996 |

* cited by examiner

TORSIONAL VIBRATION DAMPING ARRANGEMENT, PARTICULARLY FOR THE POWER TRAIN OF A VEHICLE

PRIORITY CLAIM

This is a U.S. national stage of Application No. PCT/EP20091063186, filed on Oct. 9, 2009, which claims priority to German Application No: 10 2008 043 211.3, filed: Oct. 28, 2008, the contents of which are incorporated herein by reference.

BACKGROUND OF THE INVENTION

1. Field of the Invention

The present invention is directed to a torsional vibration damper arrangement, particularly the drivetrain of a vehicle, comprising a torsional vibration damper with a primary side and a secondary side that is rotatable with respect to the primary side around an axis of rotation against the action of a damper spring arrangement. One side of the primary side and secondary side comprises two cover disk elements and the other side of the primary side and secondary side comprises a central disk element arranged between the cover disk elements. The cover disk elements are connected to one another by first connection elements radially inside the damper spring arrangement so as to be fixed axially and so as to transmit torque.

2. Related Art

A torsional vibration damper arrangement of the type mentioned above in the form of a torsional vibration damper provided for a clutch disk of a motor vehicle friction clutch is known from DE 44 30 262 A1. The two cover disk elements of this known torsional vibration damper arrangement on the secondary side, i.e., the two cover disk elements are fixedly connected to a clutch disk hub and fixedly connected to one another by rivet pins radially inside the damper springs of the damper spring arrangement that extend approximately in circumferential direction. The two cover disk elements are pressed axially toward one another against a flange ring arranged therebetween by the rivet heads of the rivet pins which outwardly overlap the cover disk elements so that a solid constructional unit results in which, on one side, the two cover disk elements are fixedly connected to one another by the rivet pins in axial direction both toward one another and away from one another, and torque can be transmitted between the two cover disk elements by these rivet pins arranged radially inside the damper spring arrangement.

DE 27 36 492 C2 discloses a clutch disk with a torsional vibration damper arrangement provided therein in which the two cover disk elements are located on the primary side, i.e., support the friction facings of the clutch disk. Rivet pins having a rectangular cross section are also provided radially inside the damper spring arrangement in this arrangement. These rivet pins are positioned so as to engage by their axial end areas in correspondingly shaped through-openings of the cover disk elements and are then deformed to form rivet heads or portions overlapping the cover disk elements. A small intermediate space initially formed between the axial end areas of the rivet pins and the cover disk elements is eliminated during this deformation process by material flow.

SUMMARY OF THE INVENTION

It is an object of the present invention to provide a torsional vibration damper arrangement in which an improved coupling between the cover disk elements is achieved.

According to one embodiment of the invention, a torsional vibration damper arrangement, particularly the drivetrain of a vehicle, comprises a torsional vibration damper with a primary side and with a secondary side that is rotatable with respect to the primary side around an axis of rotation against the action of a damper spring arrangement, wherein one side of the primary side and secondary side comprises two cover disk elements and the other side of the primary side and secondary side comprises a central disk element arranged between the cover disk elements, wherein the cover disk elements are connected to one another by first connection elements radially inside the damper spring arrangement so as to be fixed axially and so as to transmit torque.

For this purpose, the cover disk elements are connected to one another by second connection elements in such a way that they are prevented from moving axially away from one another so that substantially no torque can be transmitted between the cover disk elements by the second connection elements.

In the construction of a torsional vibration damper arrangement according to one embodiment of the invention, it is ensured first of all that a spreading apart of the cover disk elements caused by centrifugal force acting on the damper spring arrangement radially outwardly is counteracted by providing the second connection elements radially outside the damper spring arrangement. In so doing, it must be taken into account that these cover disk elements are generally formed of sheet metal material and, therefore, owing to the deformability of such sheet metal material, are inclined to move away from one another axially under corresponding loading.

In the construction according to one embodiment of the invention the second connection elements can essentially not transmit any torque between the cover disk elements, i.e., actually serve only for axial support, an overdetermination of the system comprising the two cover disk elements and the first connection elements and second connection elements is prevented. A fixed and defined connection of the two cover disk elements for torque transmission, i.e., they are also coupled so as to be fixed with respect to rotation relative to one another, is produced only by the first connection elements that are disposed farther inward radially, so that no constraints or permanently existing loads that could lead to an overloading and possibly even to breakage of the connection elements can occur in the area of the second connection elements, particularly in circumferential direction.

To ensure, in a simple manner, that the second connection elements can transmit substantially only an axial force, it is further proposed that a through-opening is provided in each instance in association with every second connection element in the two cover disk elements, and the second connection elements are received by each axial end area in a through-opening, and that, in the case of at least one through-opening, an intermediate space is formed at least in some areas between an end area of a second connection element penetrating the through-opening and the cover disk element having the through-opening. In this connection, the intermediate space allows a relative movement between the second connection element and the cover disk element within a range of 0.2 mm to 0.6 mm, preferably approximately 0.4 mm.

The presence of a gap-like intermediate space further makes it possible that at least one second connection element can tilt with respect to at least one cover disk element.

In an embodiment form which can be realized in a particularly simple but very stable manner, the second connection elements are constructed as rivet elements. In this case, rivet heads formed at the axial end areas of the second connection elements advantageously enable an axial support of the cover disk elements with respect to the second connection elements.

The axial support of the cover disk elements, particularly in direction away from one another, can be realized in a simple manner in that the at least one rivet head overlaps the associated cover disk element in its area surrounding the through-opening. Accordingly, the cover disk elements can directly contact one or more rivet heads when axially loaded in a corresponding manner.

In another embodiment form, it is proposed that the at least one rivet head overlaps a supporting disk supported at the second connection element, and the supporting disk overlaps the associated cover disk element in its area surrounding a through-opening. Accordingly, in this manner, the cover disk elements can lie against one or more supporting disks so that the axial support is carried out indirectly. Of course, a respective rivet head holding a supporting disk can also be dimensioned such that it overlaps an associated cover disk element.

In this constructional variant, it is particularly advantageous when the supporting disk is securely held between the rivet head and a first supporting area formed at the second connection element. By providing a first supporting area for a supporting disk, it is ensured that this supporting disk is held in a defined position with respect to the connection element and, therefore, also with respect to an associated cover disk element during the process of deforming a second connection element for producing a rivet head. Accordingly, this deformation process when riveting can be realized in a substantially easier manner because there is no risk that an excessive deformation of a connection element will impair the required movement play between the connection element and a cover disk element.

In another embodiment form, the supporting disk can be elastically deformable.

In order to secure the two cover disk elements also in direction axially toward one another, it is further proposed that at least one second connection element has a second supporting area associated with at least one cover disk element for supporting the cover disk element against movement toward the other cover disk element.

Also, the first connection elements can preferably be constructed as rivet elements.

The damper springs of the damper spring arrangement can be protected against unwanted radial shifting under loading by centrifugal force when at least one of the cover disk elements extends toward the other cover disk element radially outside the damper spring arrangement to provide a radial support for the damper spring arrangement.

In a further constructional variant of the torsional vibration damper arrangement according to one embodiment of the invention, it is proposed that the cover disk elements of the torsional vibration damper substantially provide one side of the primary side and secondary side of another torsional vibration damper, and the other side of the primary side and secondary side of the other torsional vibration damper is substantially provided by another central disk element arranged between the cover disk elements, wherein the other central disk element is rotatable around the axis of rotation with respect to the cover disk elements against the action of another damper spring arrangement. Therefore, in this case, the torsional vibration damper arrangement is constructed in two stages with two torsional vibration dampers acting in series, wherein the second connection elements simultaneously ensure that an unwanted or undefined axial movement of the cover disk elements with respect to one another is also prevented in the area of the other torsional vibration damper.

The other torsional vibration damper can be arranged radially outside the first-named torsional vibration damper.

The present invention is further directed to a hydrodynamic coupling device, particularly a hydrodynamic torque converter, comprising a torsional vibration damper arrangement according to the invention in the torque transmission path between a lockup clutch and a driven member.

The invention is further directed to a wet clutch arrangement, particularly a multiple-disk clutch, comprising a torsional vibration damper arrangement according to the invention in the torque transmission path between a friction surface arrangement and a driven member.

BRIEF DESCRIPTION OF DRAWINGS

The present invention will be described in detail in the following with reference to the accompanying drawings. In the drawings.

DETAILED DESCRIPTION OF DRAWINGS

Figure 1:
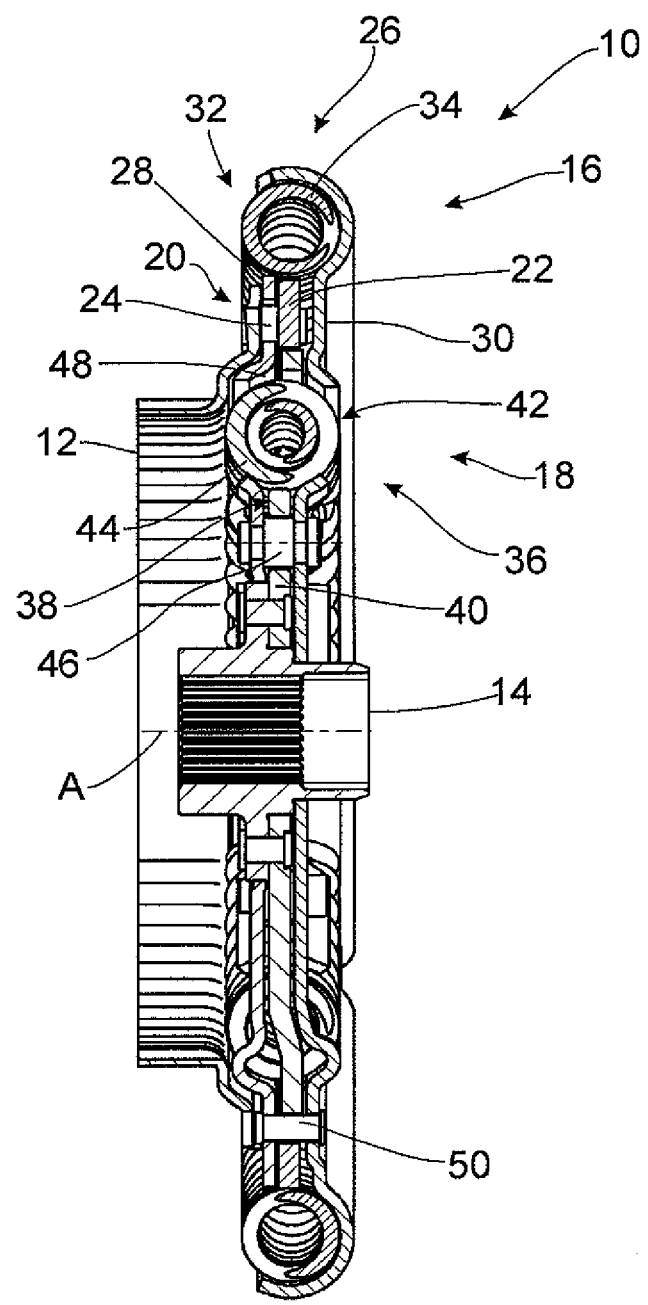
FIG. 1 is a torsional vibration damper arrangement in longitudinal section.

A torsional vibration damper arrangement is designated generally by 10 in FIG. 1. This torsional vibration damper arrangement 10, whose construction will be described in detail in the following, comprises two torsional vibration dampers 16, 18 acting in series in the torque flow between a drive element 12, which is constructed in the present instance as an inner disk carrier, and a driven element 14, which is constructed in this instance as a hub.

A primary side 20 of the radially outer torsional vibration damper 16 comprises a central disk element 22 that is constructed as an annular disk and which is fixedly connected to the drive element 12 by rivet pins 24. A secondary side 26 of the torsional vibration damper 16 comprises the radially outer area of two cover disk elements 28, 30, which are connected to one another in a manner which will be described in the following. A damper spring arrangement 32 comprising a plurality of damper springs 34 arranged successively in circumferential direction and are constructed, e.g., as steel helical compression springs, acts between the primary side 20 and the secondary side 26 of the torsional vibration damper 16. The damper springs 34 are supported at the central disk element 22 on one side and the cover disk elements 28, 30 on the other side directly or via supporting elements and accordingly allow a relative rotation between the primary side 20 and the secondary side 26 around an axis of rotation A.

A primary side 36 of the radially inner torsional vibration damper 18 encompasses the radially inner area of the two cover disk elements 28, 30. A secondary side 38 of the torsional vibration damper 18 encompasses a central disk element 40 which, like central disk element 22 of the radially outer torsional vibration damper 16, is constructed as an annular disk and is situated between the two cover disk elements 28, 30. The central disk element 40 is fixedly connected, e.g., by riveting, to the driven element 14 on the radially inner side. In its radially outer area, the central disk element 40, like the cover disk elements 28, 30, cooperates with a damper spring arrangement 42. The damper springs 44 of the damper spring arrangement 42, which are also constructed, e.g., as steel helical compression springs, can be supported with respect to the cover disk elements 28, 30 on one side and the central disk element 40 on the other side.

The two cover disk elements 28, 30 are fixedly connected to one another radially inside the damper spring arrangement 42 of the radially inner torsional vibration damper 18 by a plurality of first connection elements arranged, preferably equidistant from one another, in circumferential direction and are constructed in this instance as rivet pins 46. In their central area, the rivet pins 46 penetrate the central disk element 40 with circumferential movement play so that the primary side 36 and secondary side 38 of the torsional vibration damper 18 are also limited with respect their relative rotational angle simultaneously. In the case of the radially outer torsional vibration damper 16, the rivet pins 24 can achieve a functionality of this kind.

The rivet pins 46 acting as first connection elements ensure on the one hand by their central thickened portion that the two cover disk elements are held at a defined axial distance. On the other hand, a torque transmission connection between the two cover disk elements 28, 30 is produced by these rivet pins 46 so that the cover disk elements 28, 30 are not only fixedly connected to one another in both axial directions by the rivet pins 46, but are also fixedly connected to one another in circumferential direction, i.e., they cannot move relative to one another.

FIG. 1 further shows that the two cover disk elements 28, 30 are shaped in such a way on the radially outer side of the damper springs 44 of the damper spring arrangement 42 that portions of the two cover disk elements 28, 30 that extend radially outward and toward one another form a radial support 48 for the damper springs 44. Since the latter are loaded on the outer side in rotational operation depending on centrifugal force, this support 48 is radially loaded in a corresponding manner, which, in view of the contours of the two cover disk elements which extend radially outward and toward one another, can result in a force which spreads them apart axially.

In order to counteract this loading of, or a spreading apart of, the cover disk elements 28, 30, second connection elements constructed as rivet pins 50 are provided in the area radially outside the damper spring arrangement 42 but radially inside the damper spring arrangement 32. As will be explained in more detail in the following, the rivet pins 50 which are provided as second connection elements and are preferably likewise arranged equidistant to one another circumferentially counteract a spreading apart of the cover disk elements 28, 30 so that they maintain a defined axial position, particularly also in their radially outer area, even when highly loaded by centrifugal force.

Figure 2:
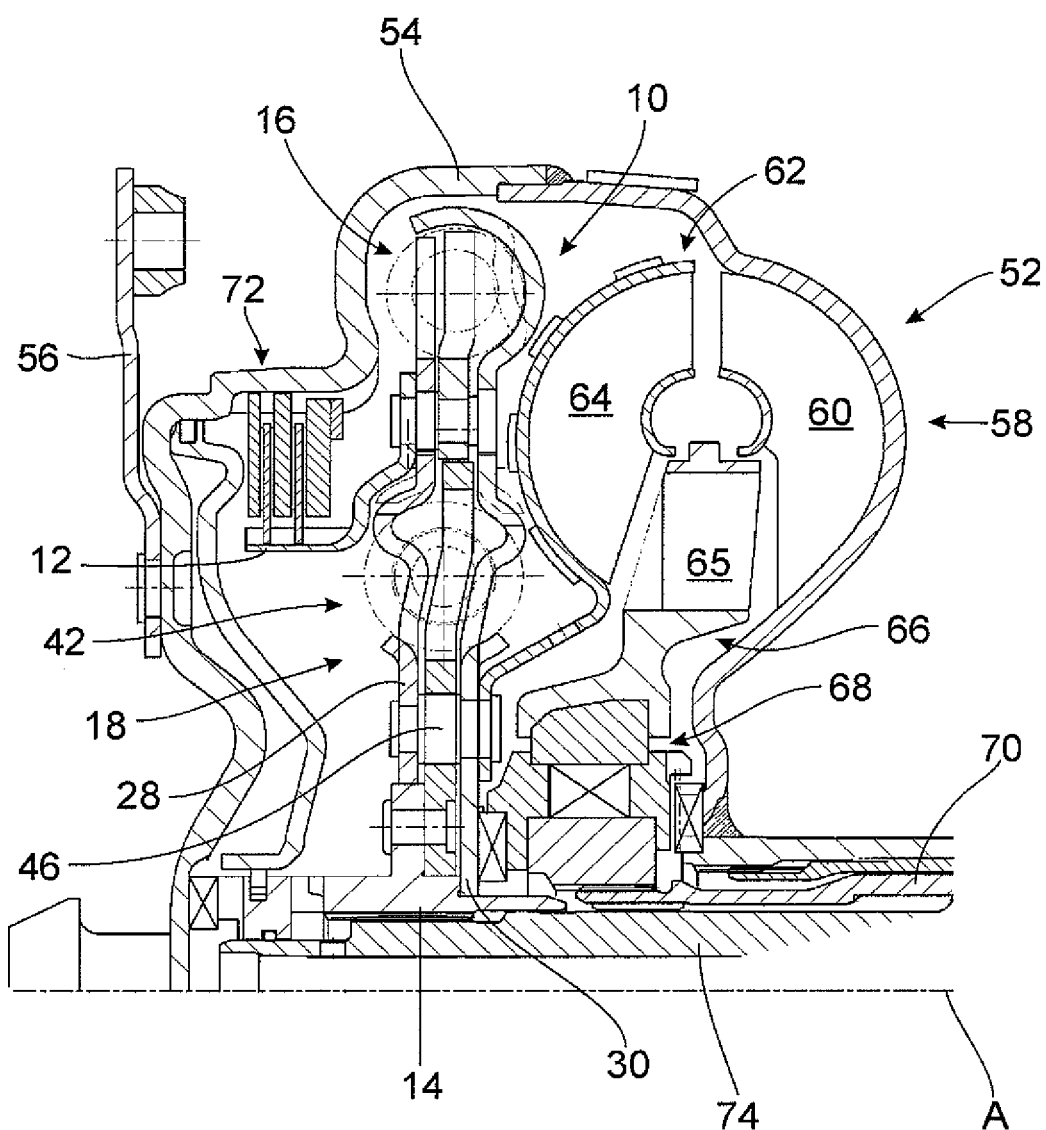
FIG. 2 is a hydrodynamic torque converter with a torsional vibration damper arrangement according to FIG. 1.

Before addressing the functionality and construction of these rivet pins 50, an application of a torsional vibration damper arrangement 10 of the type mentioned above will be described referring to FIG. 2. FIG. 2 shows a hydrodynamic torque converter, designated generally by 52, as an example of a hydrodynamic coupling device. The torque converter 10 comprises a converter housing 54 that can be connected to a driveshaft or the like by a coupling device 56. An impeller, designated generally by 58, having a plurality of impeller vanes 60 is formed at the housing 54. A turbine 62 having a plurality of turbine blades 64 located axially opposite the impeller vanes 60 is provided in the interior of the housing 54. A stator, designated generally by 66, with its stator vanes 65 is located between the impeller 58 and the turbine 62. The stator 66 is mounted on a supporting hollow shaft 70 by a freewheel arrangement 68 so as to be rotatable in one direction around the axis of rotation.

The torsional vibration damper arrangement 10, which has the construction described in FIG. 1, is arranged in the torque transmission path between a lockup clutch 72 and a transmission input shaft 74 or the driven element 14 coupled therewith so as to be fixed with respect to rotation relative to it. The lockup clutch 72 comprises a friction surface arrangement formed by a plurality of friction disks and, in the engaged state of the lockup clutch 72, a torque is conducted from the housing 54 via the inner disk carrier acting as drive element 12 first to the radially outer torsional vibration damper 16 and from the latter to the radially inner torsional vibration damper 18. The torque is transmitted by the driven element 14 to the transmission input shaft 74.

The turbine 62 is coupled to a mass region formed substantially by the two cover disk elements 28, 30 and is located between the two torsional vibration dampers 16 and 18. This can be carried out, for example, by the rivet pins 46 that serve to fixedly connect the two cover disk elements 28, 30 radially inside the damper spring arrangement 42 of the torsional vibration damper 18 and that act as first connection elements. Therefore, the radially inner torsional vibration damper 18 acts to dampen vibrations with its damper spring arrangement 42 also when the lockup clutch 72 is released and torque is transmitted to the transmission input shaft 74 via the turbine 62.

Figure 3:
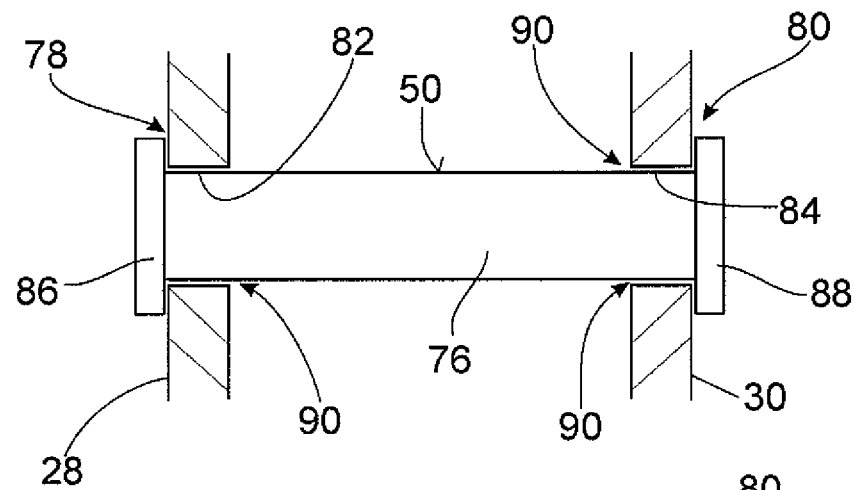
FIG. 3 is a detailed view of the connection of two cover disk elements of the torsional vibration damper arrangement according to FIG. 1 with a connection element constructed as a rivet element.

FIG. 3 is a sectional view showing the cooperation of a rivet pin 50 acting as second connection element with the two cover disk elements 28, 30. A shank area 76 of the rivet pin 50 penetrates through-openings 82, 84, provided in the cover disk elements 28, 30 for this purpose, by its axial end areas 78, 80. The rivet heads 86, 88 which are provided or formed at the rivet pin 50, also in the end areas 78, 80, overlap the cover disk elements 28, 30 in their areas surrounding the through-openings 82, 84 and accordingly ensure that the cover disk elements 28, 30 can be supported at the rivet pin 50 in direction facing away from one another.

Figure 4:
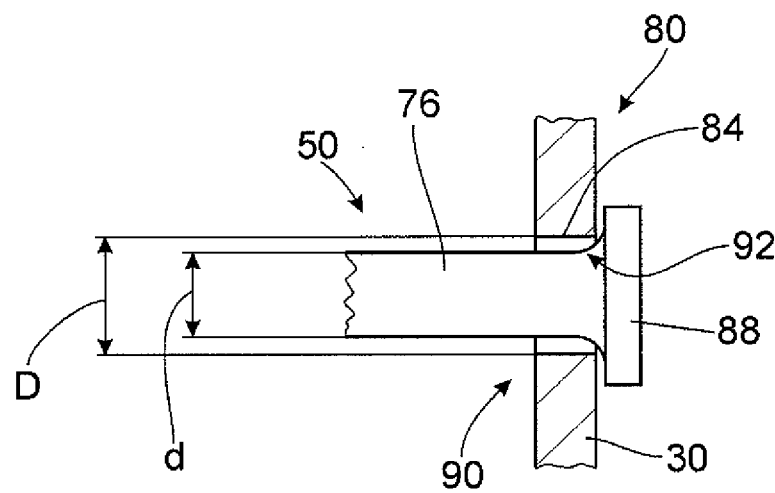
FIG. 4 is a detailed view corresponding to FIG. 3.

It can be seen in FIG. 3 that a gap-like intermediate space 90 is formed between the shank area 76 of the rivet pin 50 and the cover disk elements 28, 30 in the end areas 78, 80 in which the shank area 76 penetrates the cover disk elements 28, 30. This gap-like intermediate space 90 occurs as a result of corresponding dimensioning of the shank area 76 particularly in its area penetrating the cover disk elements 28, 30 on the one hand and of the through-openings 82, 84 on the other hand. As is illustrated in FIG. 4, the shank area 76, for example, when formed with a round cross section, can be constructed with an outer diameter d that is smaller than the inner diameter D of the through-openings 82, 84. The gap-like intermediate space 90 formed in this way can be dimensioned in such a way that the rivet pin 50 has a movement play in relation to the cover disk elements 28, 30 in the range of 0.2 mm to 0.6 mm, preferably about 0.4 mm, which means that the outer diameter d, for example, is smaller by 0.4 mm than the inner diameter D.

By providing this movement play or intermediate space 90, it is ensured that the cover disk elements 28, 30 can contact the rivet heads 86, 88 axially but, because of the fixed connection between the rivet pin 50 and the cover disk elements 28, 30 which would otherwise be lacking, a more or less loose connection results which is not suitable for transmitting torque between the cover disk elements 28, 30. This prevents an overdetermination of the system comprising the two cover disk elements 28, 30, the rivet pins 46 acting as first connection elements, and the rivet pin 50 acting as second connection elements. As a result, the second rivet pins 50 are generally only subjected to an axial load and not a transverse load, which prevents the risk of a breakage of the same.

FIG. 4 shows a situation such as can arise after the deformation of a rivet pin 50, for example, for forming the rivet head 88. Owing to the material flow taking place, the transition in the transitional area 92 between the shank area 76 and the rivet head 88 takes place not by steps but, rather, continuously with a gradual expansion of the shank area 76 toward the rivet head 88. Accordingly, a situation can arise in which there is no gap-like intermediate space 90 between the shank area 76 and—in the present instance—the cover disk element 30 over the entire longitudinal extension of the through-opening 84, but rather the cover disk element 30 contacts, for example, the axially outer side of the cover disk element 30 of this transitional area 92. However, this situation is generally not problematic because, even in this state, the rivet pin 50 remains tiltable in relation to the cover disk element 30 but, because of the curved transitional area 92, is also displaced axially by a slight tilting. However, this does not lead to a situation in which torque could be transmitted by a rivet pin 50 of this kind. Further, this curved transitional area 92 will have been deformed after a comparatively brief period of operation because the edge-like border of the through-openings 84 at the cover disk element 30 will work into the material of the rivet pin 50.

A modified embodiment form of a rivet pin 50 of the type mentioned above is shown in FIG. 5. It will be seen that the shank area 76 of the rivet pin 50 is constructed in a stepped manner in this case and becomes narrower at respective transition steps 94, 96 in the end areas 78, 80. These steps 94, 96 create a supporting area against which the cover disk elements 28, 30 can contact one another so that the maximum distance between the cover disk elements 28, 30 is dictated by the rivet heads 86, 88 on the one hand, and the minimum distance is given by the axial distance between the two steps 94, 96 on the other hand. It can be seen from FIG. 5 that an axial, gap-like intermediate space 98 is formed between the rivet heads 86, 88 and the outer sides of the cover disk elements 28, 30 when the latter contact the steps 94, 96 and allows a relative axial movement between the rivet pin 50 and the cover disk elements 28, 30. In connection with the gap-like intermediate space 90 which is also present in this case in the area of the respective through-openings 82, 84, it is also ensured in this embodiment form that the rivet pin 50 is freely movable to a slight extent relative to the two cover disk elements 28, 30, i.e., is displaceable or tiltable axially as well as in circumferential direction, so that it is ensured that the cover disk elements 28, 30 are held together axially, but there is essentially no torque transmitted between the cover disk elements 28, 30.

Figure 6:
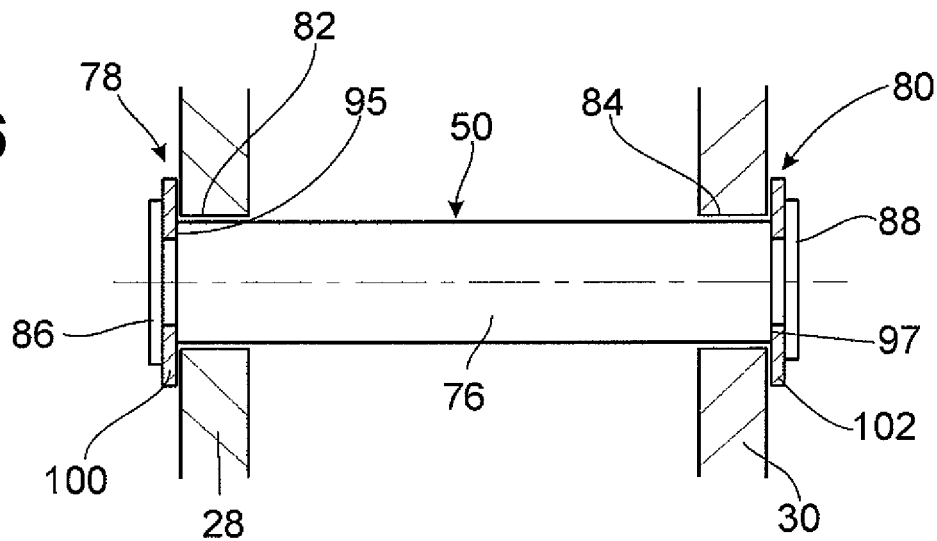
FIG. 6 is another detailed view of a modified embodiment form corresponding to FIG. 3.

FIG. 6 shows an embodiment form of a rivet pin 50 in which the shank area 76 is formed with steps 95, 97 in the end areas 78, 80. These steps 95, 97 are located at the axial position which defines the maximum spacing of the two cover disk elements 28, 30. Supporting disks 100, 102 are axially supported at these steps 95, 97 and are accordingly held by the rivet heads 86, 88 in a fixed manner and at a defined axial position at the rivet pin 50. The supporting disks 100, 102 overlap the cover disk elements 28, 30 in the area of the through-openings 82, 84. It can be seen in FIG. 6 that the rivet heads 86, 88 also actually overlap the cover disk elements 28, 30 slightly in this area.

Providing the supporting disks 100, 102 essentially achieves a functionality corresponding to the functionality described above with reference to FIG. 3 for the axial support of the cover disk elements 28, 30 in direction away from one another. Since this axial support is carried out in this case by the supporting disks 100, 102, specifically at that axial position at which the steps 95, 97 are formed, a sharp-edged transition results from the shank area 76 to the area supporting the cover disk elements 28, 30, namely, the supporting disks 100, 102. In this case, there is practically no danger that, as a result of the deformation of the rivet pin 50 when forming the rivet heads 86, 88, the transitional area 92 described above with reference to FIG. 4 will be formed where the support of the cover disk elements 28, 30 is carried out, which could also therefore impair the movability of the rivet pin 50.

Another advantage is that the rivet deformation process for forming the rivet heads 86, 88 can be substantially facilitated because the deforming force required for this purpose need not be applied as carefully as in the embodiment form shown in FIG. 3. In the latter case, care must be taken not to apply too large a deformation force generating an excessive deformation of the rivet pins 50 in the end areas 78 which could counteract the movability and tiltability of the rivet pin 50.

Figure 5:
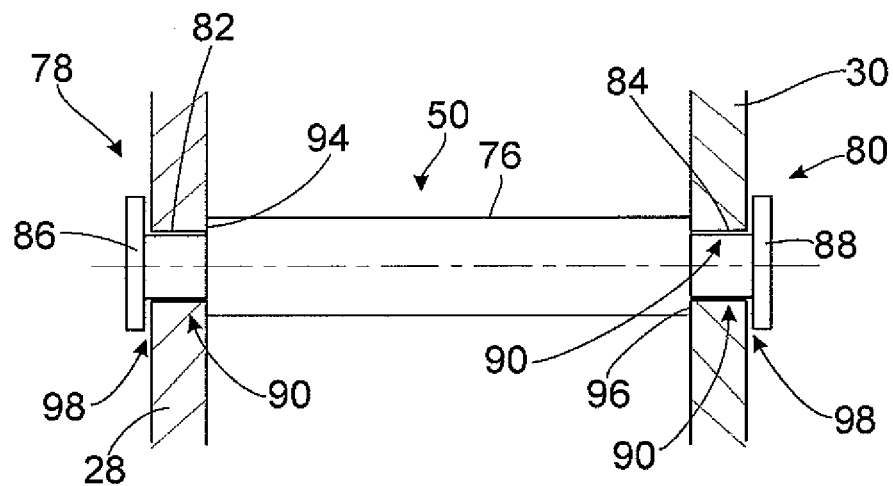
FIG. 5 is another detailed view of a modified embodiment form corresponding to FIG. 3.
Figure 7:
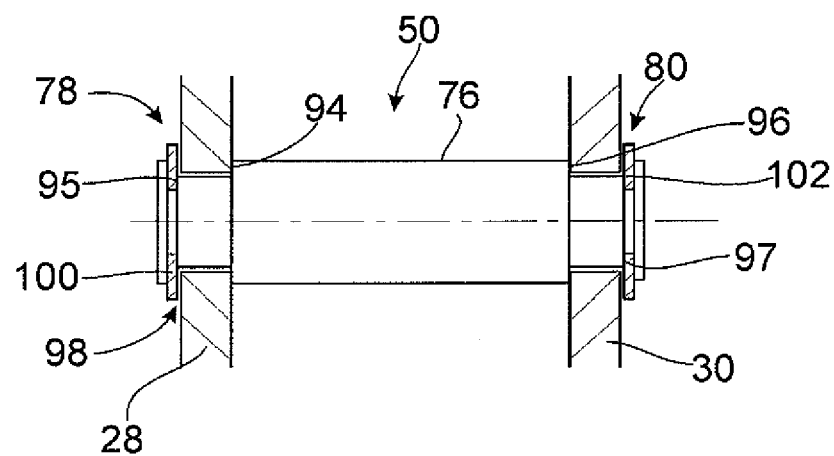
FIG. 7 is another detailed view of a modified embodiment form corresponding to FIG. 3.

The embodiment form shown in FIG. 7 shows a combination of the embodiment forms described with reference to FIGS. 5 and 6. It can be seen that the shank area 76 of the rivet pin 50 is two-tiered in the end areas 78, 80 to form steps 94, 95 at end area 78 and steps 96, 97 at end area 80. Accordingly, a defined axial intermediate space 98 is again produced and, in this case, is formed in a defined manner between step 94 and supporting disk 100 and between step 96 and supporting disk 102, respectively.

Figure 8:
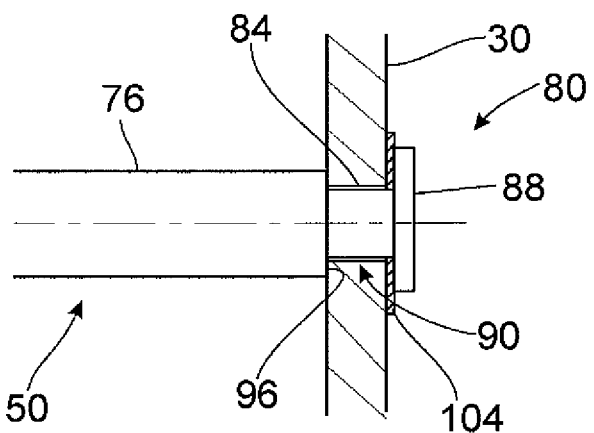
FIG. 8 is another detailed view of a modified embodiment form corresponding to FIG. 3.

FIG. 8 shows an embodiment form in which the rivet pin 50 is supported in its end area 80 with respect to the cover disk element 30 by an elastically deformable supporting disk 104. The rivet head 88 overlaps the cover disk element 30 in the area of the through-opening 84 as well as the radially inner area of the supporting disk 104 which in turn contacts the outer side of the cover disk element 30. The supporting disk 104 can be constructed, for example, as a disk spring or elastomer ring so that it is ensured that the shank area 76 is pressed with its step 96 against the inner side of the cover disk element 30, but a certain relative axial movability between the cover disk element 30 and the rivet pin 50 is still possible. Owing to the fact that the gap-like intermediate space 90 is again present in the location where the shank area 76 penetrates the through-opening 84, it is possible that the rivet pin 50 can be displaced with respect to the cover disk element 30 in circumferential direction on the one hand, i.e., in this case in the drawing plane, or also in radial direction, i.e., for example, perpendicular to the drawing plane, but at the same time can also undergo tilting with respect to the cover disk element 30 so that, in this instance too, substantially no torque can be transmitted between the two cover disk elements 28, 30 via the rivet pins 50.

Owing to the above-described construction of the rivet pins 50 acting as second connection elements radially outside of the damper spring arrangement 42 and their interaction with the cover disk elements 28, 30, an overdetermination in the connection of the cover disk elements 28, 30 which could lead to a permanent overloading of these rivet pins 50 is avoided. Nevertheless, the cover disk elements 28, 30 are prevented from spreading apart axially due to the load exerted radially outwardly by the damper springs 44.

It is understood that there are various possibilities for variation and combination in the construction of the torsional vibration damper arrangement 10 according to the invention, especially in the area of the rivet pins 50 acting as second connection elements. For example, the movability with respect to the cover disk elements which was mentioned above referring to the various embodiment forms is provided in principle for all of the rivet pins 50 in both end areas by providing gap-like intermediate spaces in each instance. However, differently shaped rivet pins 50 could also be operative successively in circumferential direction in a torsional vibration damper. These rivet pins 50 could also be shaped differently in their two end areas. It is further understood that the principles of the present invention can also be applied in a torsional vibration damper arrangement comprising only one torsional vibration damper which is then substantially constructed in the manner of the radially inner torsional vibration damper in the torsional vibration damper arrangement shown in FIG. 1. It is also understood that the torsional vibration damper arrangement constructed according to the invention can be used in other systems of a drivetrain, for example, in a wet disk clutch or the like which also operates as starting element.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damper arrangement, comprising:
 a damper spring arrangement;
 a first side of the torsional vibration damper, comprises a first cover disk element and a second cover disk element;
 a second side of the torsional vibration damper that is rotatable with respect to the first side around an axis of rotation against the action of the damper spring arrangement, and comprises a central disk element arranged between the cover disk elements;
 a plurality of first connection elements configured to connect the cover disk elements to one another radially inside the damper spring arrangement to be fixed axially and to transmit torque; and
 a plurality of second connection elements configured to connect the cover disk elements to one another such that the cover disk elements are prevented from moving axially away from one another,
 wherein substantially no torque is transmitted between the cover disk elements by the plural second connection elements while torque is being transmitted by the plurality of first connection elements.

2. The torsional vibration damper arrangement according to claim 1, further comprising:
 a respective through-opening for each second connection element in the first and second cover disk elements;
 a respective axial end area for each respective through-opening configured to receive the second connection elements; and
 at least one intermediate space is formed at least in one area between an end area of a second connection element penetrating the through-opening and the cover disk element having the through-opening.

3. The torsional vibration damper arrangement according to claim 2, wherein the intermediate space is configured to allow a relative movement between the second connection element and the cover disk elements within a range of 0.2 mm to 0.6 mm.

4. The torsional vibration damper arrangement according to claim 2, wherein at least one second connection element is configured to tilt with respect to at least one of the cover disk elements.

5. The torsional vibration damper arrangement according to claim 2, further comprising rivet heads formed at the axial end areas of the second connection elements that enable an axial support of the cover disk elements with respect to the second connection elements.

6. The torsional vibration damper arrangement according to claim 5, wherein at least one rivet head overlaps the associated cover disk element in its area surrounding a through-opening.

7. The torsional vibration damper arrangement according to claim 5, wherein at least one rivet head overlaps a supporting disk supported at the second connection element, and the supporting disk overlaps the associated cover disk element in its area surrounding a through-opening.

8. The torsional vibration damper arrangement according to claim 7, wherein the supporting disk is configured to be securely held between the rivet head and a first supporting area formed at the second connection element.

9. The torsional vibration damper arrangement according to claim 7, wherein the supporting disk is elastically deformable.

10. The torsional vibration damper arrangement according to claim 5, wherein an intermediate space that allows axial movability between the second connection element and a respective one of the cover disk elements is formed at least in some areas between at least one rivet head and the associated cover disk element.

11. The torsional vibration damper arrangement according to claim 1, wherein the plural second connection elements are constructed as rivet elements.

12. The torsional vibration damper arrangement according to claim 1, wherein at least one second connection element has a second supporting area associated with at least one cover disk element for supporting the cover disk element against movement toward the other cover disk element.

13. The torsional vibration damper arrangement according to claim 1, wherein the plural first connection elements are constructed as rivet elements.

14. The torsional vibration damper arrangement according to claim 1, wherein one of the first and second cover disk elements extends towards the other of the first and second cover disk element radially outside the damper spring arrangement to provide a radial support for the damper spring arrangement.

15. The torsional vibration damper arrangement according to claim 1, wherein the cover disk elements of the torsional vibration damper substantially provide one side of the first side and second side of another torsional vibration damper, and the other side of the first side and second side of the other torsional vibration damper is substantially provided by another central disk element arranged between the cover disk elements, wherein the other central disk element is rotatable around the axis of rotation with respect to the cover disk elements against the action of another damper spring arrangement.

16. The torsional vibration damper arrangement according to claim 15, wherein the other torsional vibration damper is arranged radially outside the torsional vibration damper.

17. A hydrodynamic coupling device, comprising a torsional
vibration damper arrangement in a torque transmission path between a lockup clutch and
a driven member, the torsional vibration damper arrangement, comprising:
a damper spring arrangement;
a first side of the torsional vibration damper, the first side comprises a first cover disk element and a second cover disk element;
a second side of the torsional vibration damper that is rotatable with respect to the first side around an axis of rotation against the action of the damper spring arrangement, the second side comprises a central disk element arranged between the cover disk elements on the first side;
a plurality of first connection elements configured to connect the cover disk elements to one another radially inside the damper spring arrangement to be fixed axially and to transmit torque; and
a plurality of second connection elements configured to connect the cover disk elements to one another such that the cover disk elements are prevented from moving axially away from one another,
wherein substantially no torque is transmitted between the cover disk elements by the plural second connection elements while torque is being transmitted by the plurality of first connection elements.

18. A wet clutch arrangement, comprising a torsional vibration damper arrangement in a torque transmission path between a friction surface arrangement and a driven member, the torsional vibration damper arrangement, comprising:
a damper spring arrangement;
a first side of the torsional vibration damper, comprises a first cover disk element and a second cover disk element;
a second side of the torsional vibration damper that is rotatable with respect to the first side around an axis of rotation against the action of the damper spring arrangement, the second side comprises a central disk element arranged between the cover disk elements;
a plurality of first connection elements configured to connect the cover disk elements to one another radially inside the damper spring arrangement to be fixed axially and to transmit torque; and
a plurality of second connection elements configured to connect the cover disk elements to one another such that the cover disk elements are prevented from moving axially away from one another,
wherein substantially no torque is transmitted between the cover disk elements by the plural second connection elements while torque is being transmitted by the plurality of first connection elements.

\* \* \* \* \*